(12) United States Patent
Kasle

(10) Patent No.: US 10,764,984 B2
(45) Date of Patent: Sep. 1, 2020

(54) METHOD AND APPARATUS FOR MUSICAL INSTRUMENT WITH DYNAMIC ANIMATION AND LIGHTING

(71) Applicant: David Kasle, Mountain View, CA (US)

(72) Inventor: David Kasle, Mountain View, CA (US)

(*) Notice: Subject to any disclaimer, the term of this patent is extended or adjusted under 35 U.S.C. 154(b) by 0 days.

(21) Appl. No.: 16/049,150

(22) Filed: Jul. 30, 2018

(65) Prior Publication Data

US 2020/0037418 A1    Jan. 30, 2020

(51) Int. Cl.
  *H05B 47/12*  (2020.01)
  *F21V 33/00*  (2006.01)
  *H05B 45/20*  (2020.01)
  *F21Y 115/10* (2016.01)

(52) U.S. Cl.
  CPC ......... *H05B 47/12* (2020.01); *F21V 33/0056* (2013.01); *H05B 45/20* (2020.01); *F21Y 2115/10* (2016.08)

(58) Field of Classification Search
  CPC ............ H05B 37/0236; H05B 33/0872; H05B 47/12; H05B 45/20; F21V 33/0056; F21Y 2115/10
  See application file for complete search history.

(56) References Cited

U.S. PATENT DOCUMENTS

| | | | |
|---|---|---|---|
| 2002/0038157 A1* | 3/2002 | Dowling | A63J 17/00 700/90 |
| 2005/0172785 A1* | 8/2005 | Fisher-Robbins | A63J 17/00 84/464 R |
| 2006/0291212 A1* | 12/2006 | Forsman | G10H 3/146 362/276 |
| 2010/0071535 A1* | 3/2010 | McKinney | H05B 47/12 84/464 R |
| 2014/0077723 A1* | 3/2014 | Ahern | G10H 1/00 315/299 |
| 2015/0009417 A1* | 1/2015 | Jargiello, III | F21V 33/0056 348/789 |
| 2015/0094174 A1* | 4/2015 | Chung | A63B 59/50 473/564 |
| 2018/0286365 A1* | 10/2018 | Washington | F21V 23/009 |

* cited by examiner

Primary Examiner — Raymond R Chai

(57) ABSTRACT

Methods and apparatus for producing lighting for a musical instrument are disclosed herein. According to some embodiments, light is produced using LEDs responsive to sound input such that the amount of light produced by the LEDs, or the sequence and/or color produced by the LEDs, is proportional to or otherwise associated with the noise level detected by a microphone. The light produced may take the form of an animation or sequence that resembles a moving object, such as rainfall or a spiral, for example. Furthermore, a user can easily tune the lighting system to control various aspects of the light generated by the LEDs, for example, to adjust a sound level threshold, an animation speed/delay, or a brightness setting of the lighting system.

19 Claims, 9 Drawing Sheets

300

METHOD AND APPARATUS FOR MUSICAL INSTRUMENT WITH DYNAMIC ANIMATION AND LIGHTING

FIELD

Embodiments of the present invention generally relate to the field of dynamic lighting and animation systems. More specifically, embodiments of the present invention relate to methods and apparatus for controllably generating dynamic lighting and animation to accompany a musical instrument for entertainment.

BACKGROUND

There is growing need in the field of lighting systems to provide a lighting experience based on input, such as sound generated by a musical instrument, to augment the music played by the instrument, and to enhance audience enjoyment thereof and entertainment in general. There are a growing number venues that combine the playing of musical instruments, by artists, with lighting devices.

Conventional lighting systems that are used with musical instruments generally rely on pre-determined or pre-recorded lighting sequences or animations, and cannot adequately generate new, dynamic lighting sequences or animations in real-time, especially based on sound input of a musical instrument. Furthermore, current musical event lighting systems cannot easily be adjusted to adjust or modify the lighting sequences or animations because the lighting sequences or animations are pre-defined, e.g., "canned," with a few exceptions.

Furthermore, most existing event lighting systems are housed in separate enclosures and require complicated wiring to connect the lighting components together. What is needed is a flexible, dynamic lighting system capable of generating dynamic and adjustable lighting sequences or animations based on sound input.

SUMMARY

Methods and apparatus for producing dynamic lighting animations for a musical instrument are disclosed herein. According to some embodiments, light is produced using LEDs responsive to sound input such that the amount of light produced by the LEDs, or the sequence and/or color produced by the LEDs, is proportional to or otherwise associated with the sound level (e.g., volume) detected by a microphone in proximity to the musical instrument being played. The light produced may take the form of an animation or sequence of light that resembles any number of various modalities, including a moving object, such as rainfall or shooting/twinkling stars, or a moving ribbon, or a spiral, for example. Furthermore, a user can easily tune the lighting system to control various aspects of the light and/or animation sequence generated by the LEDs, for example, to adjust a sound level threshold for activating the LEDs, the colors produced during the animation, a speed of the animation, or a brightness setting of the lighting system.

According to one embodiment of the present invention, an apparatus for producing lighting and animation for a musical instrument is disclosed. The apparatus includes a microphone operable to detect a sound level produced by the musical instrument, an LED interface for emitting light using a plurality of LEDs, and a microcontroller operable to send a control signal to the LED interface to cause the plurality of LEDs to emit light corresponding to a lighting sequence, where the lighting sequence is adjusted to be dynamically responsive to the real-time sound level produced by the musical instrument exceeding a predetermined sound level threshold. In one embodiment, the lighting sources and the apparatus can be housed in or on or with a musical instrument being played.

According to another embodiment, a method of producing dynamic lighting and dynamic lighting animations for a musical instrument responsive to sound produced by said musical instrument is disclosed. The method includes sending control signals to an LED interface to cause the LED interface to illuminate a plurality of LEDs in an LED animation sequence, measuring a sound level produced by a musical instrument using a microphone, determining that the sound level of the musical instrument is above a sound level threshold, and sending new control signals to the LED interface, where the new control signals adjust the LED animation sequence responsive to determining that the sound level is above the sound level threshold, and where the LED interface controls the plurality of LEDs to produce the LED animation sequence.

According to a third embodiment, a method for providing an adjustable LED animation for a musical instrument is disclosed. The method includes defining an LED brightness level using a first input device, defining an LED animation delay using a second input device, defining an LED animation threshold using a third input device, and sending a control signal to an LED interface to illuminate a plurality of LEDs communicatively coupled to the LED interface, where the plurality of LEDs display the adjustable LED animation responsive to sound generated by the musical instrument based on the LED brightness level, the LED animation delay, and the LED animation threshold.

According to some embodiments, the plurality of LEDs are disposed within the musical instrument.

According to some embodiments, the plurality of LEDs are disposed on a surface of the musical instrument, and the surface is substantially transparent.

According to some embodiments, the plurality of LEDs are secured to the surface of the musical instrument using a plurality of standoffs.

According to some embodiments, an input device communicatively coupled to the microcontroller adjusts a brightness level of the plurality of LEDs.

According to some embodiments, an input device communicatively coupled to the microcontroller adjusts an animation speed the lighting sequences.

According to some embodiments, an input device communicatively coupled to the microcontroller adjusts the sound level threshold or sensitivity.

According to some embodiments, the lighting sequences are dynamically adjusted by varying one of: a color, a brightness, a movement, a size, and a speed of the lighting sequences.

According to some embodiments, the LED animation sequence includes illuminating LEDs in a spiral pattern.

According to some embodiments, an input device is used to change an animation mode of the LED animation.

According to some embodiments, an input device is used to adjust the sensitivity to sound.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
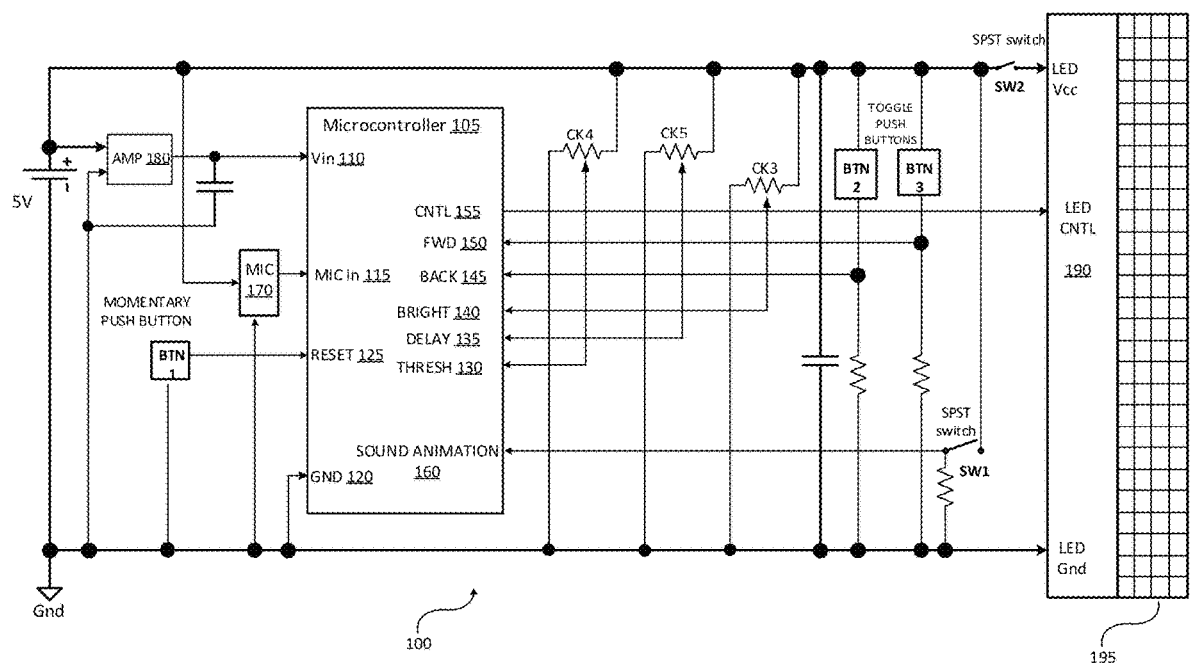
FIG. 1 is a schematic diagram depicting a circuit for producing dynamic lighting and dynamic animations using LEDs responsive to sound input according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 6, 7, and 8) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying," "updating," "determining," "selecting," "animating," "displaying," "lighting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System and Method for Dynamic Musical Instrument Lighting

Methods and apparatus for producing dynamic lighting and lighting animation for a musical instrument (e.g., a drum, piano, guitar, etc.) are disclosed herein. According to some embodiments, light is produced using color LEDs responsive to sound input such that the amount of light produced by the LEDs, or the sequence and/or color produced by the LEDs, is dynamic and particularly proportional to or otherwise associated with the sound level detected by a microphone. The sound can originate from any sound producing instrument. In the preferred embodiment, the sound producing instrument is a musical instrument. The light produced may take the form of an animation or sequence of light/color that resembles a moving object or moving pattern, such as rainfall or a spiral, or a moving ribbon of colors, or a moving star pattern, for example. The amount of light or the amount of color in the object or pattern and/or the speed of movement of the object or pattern dynamically changes in accordance with a real-time sound level of the sound producing instrument. Furthermore, a user can easily tune the lighting system to control various aspects of the light and/or animation generated by the LEDs, for example, to adjust a sound level sensitivity or threshold, a speed of the animation, or a brightness setting of the lighting system.

The dynamic lighting and/or dynamic animation system of the present invention can be used in combination with the playing of a musical instrument to enhance the enjoyment and entertainment of the musical instrument. The system can be placed inside the instrument, placed onto the instrument or placed adjacent to the instrument, for instance, as long as the lighting sources can be viewed by an audience while the instrument is being played.

With regard to FIG. 1, an exemplary circuit 100 for controllably producing dynamic LED lighting responsive to sound input is depicted according to embodiments of the present invention. The circuit 100 includes a microcontroller 105 for providing power and control signals to a plurality of LEDs, such as one or more programmable LED arrays. The microcontroller 105 includes a power supply ($V_{in}$) 110, a connection to ground 120, a microphone input 115, and a reset input 125. Any of a number of well known microcontrollers or mobile computers can be used as device 105. In one embodiment, an Arduino microcontroller, for example, can be used, such as an Arduino Mega microcontroller having 8 KB of memory. A 5 volt power supply can provide power to the power supply 110 of circuit 100, as well as microcontroller 105, microphone 170, amplifier 180, and LED interface 190. Amplifier 180 provides power to microcontroller 105. According to some embodiments, amplifier 180 provides a 9V input to microcontroller 105. Connection to ground 120 is a common return path for current in circuit 100 and is used to ground circuit 100 and components thereof. A reset input 125 is communicatively coupled to a momentary button BTN1 and used to send a reset signal to microcontroller 105 for resetting the microcontroller 105 to an initial state or default animation values.

Microphone 170 is configured to detect and measure sound generated by a sound source, e.g., a musical instrument. Microphone input 115 of microcontroller 105 receives an analog signal from a physical input device configured to measure or reproduce sound (e.g., microphone 170), where the signal represents the measured sound level of the musical instrument. The sound input is used by microcontroller 105 to generate control signals (155) for driving LED interface 190. LED interface 190 receives the signals from the microcontroller 105 and generates animation responsive to the sound input using LEDs 195. LEDs 195 can be arranged, like memory cells, in a logical array for individually addressing each.

The microcontroller 105 also receives input from several control signals, including threshold input 130, delay input 135, brightness input 140, animate Backward input 145, animate Forward input 150, and sound animation input 160. The delay input may alter the speed of the animation, the forward/backward selectors indicate the manner in which a pattern is animated, either forward through its process or backward and the threshold and sound sensitivity input changes how sensitive the animation is to the detected sound level. The brightness input alters the brightness range through which the LEDs light up during an animation sequence. The sound animation input 160 enables the microcontroller 105 to use sound to modify certain preprogrammed patterns or animations, so that the patterns or animations respond to sound input.

The microcontroller 105 generates output for control out signal 155, where the control out signal 155 is a control signal for controlling a plurality of LEDs 195. The control signal control out 155 are received by an LED receiver 190 (e.g., an asynchronous receiver) connected to the plurality of LEDs 195. The LEDs may be controlled synchronously via a clocked input or asynchronously. According to some embodiments, the LED interface 190 receives commands from microcontroller 105 that include an identifier of one or more LEDs of the plurality of LEDs 195, and the identifier is used to activate one or more of the respective LEDs. The command signal may also include three bytes of color information, where one byte of information represents a red color value, one byte of information represents a green color value, and one byte of information represents a blue color value. According to some embodiments, the LED interface 190 receives a plurality of commands and queues the commands before activate the LEDs 195 responsive to the commands.

Toggle switches SW1 and SW2 may include single-pole, single-throw switches for adjusting the behavior of the LED interface 190. Specifically, switch SW1 may be toggled on to configure the microcontroller 105 to generate animations that respond to sound by way of the LED interface 190 to generate LED light in proportion to the detected sound level. For example, when the detected sound level is above an animation threshold, the animation of LEDs 195 changes responsive to the detected sound level. According to some embodiments, the change in animation is proportional to the amount by which the detected sound level exceeds the animation threshold. For example, the brightness of the LEDs 195 or the amount of LEDs 195 that are activated may be determined based on the amount by which the detected sound level exceeds the animation threshold. As described below, the animation threshold and sensitivity level may be manually adjusted using dedicated input devices (e.g., control knobs). If the switch SW1 is toggled off, the animation generated by the LED interface 190 does not respond to detected sound levels and instead cycles through pre-determined animation patterns. Switch SW2 can be toggled on to power on the LED interface 190, or toggled off to power down the LED interface 190.

Physical input devices, such as rotary knobs or dials, may be used to control the input signals of threshold input 130, delay input 135, and brightness input 140 as discussed above. Specifically, the circuit 100 includes rotary control knobs CK1, CK2, and CK3 for adjusting the signals of threshold input 130, delay input 135, and brightness input 140, respectively. According to some embodiments, adjusting the control knobs changes an electrical resistance of the control knob to alter the respective input signal in accordance with well known methods.

When a control knob is adjusted, the associated input value used by microcontroller 105 for producing sound-driven animations is increased or decreased depending on the direction the control knob is turned (e.g., clockwise or counter-clockwise). For example, when control knob CK4 is adjusted, the threshold value used by Microcontroller 105 for producing sound-driven animations is increased or decreased depending on the direction the control knob CK4 is turned (e.g., clockwise or counter-clockwise). Decreasing the input of threshold input 130 causes the microcontroller 105 to produce animation that is more responsive to sound input (e.g., requires a lower level of sound input to trigger, adjust, or step forward an animation). Similarly, when the input of threshold 130 is increased using control knob CK4, the threshold level is increased, and therefore the animation produced by microcontroller 105 using LEDs 195 is less responsive to sound input (e.g., requires a higher level of sound input to trigger, adjust, or step forward an animation or lighting sequence).

Control knob CK5 is used to adjust the input of delay input 135. The value of delay input 135 is used by microcontroller 105 to determine the animation speed for producing dynamic animations using LEDs 195. For example, increasing the delay input 135 using control knob CK5 increases the delay between animations steps or frames, and decreasing the delay input 135 decreases the delay between animations steps or frames. In one example, a pattern may be animated across a display panel of LEDs with the size of the pattern, the direction of movement, the color the pattern or the brightness of the pattern all being dynamically adjusted in accordance with the music detected by the instrument. However, the speed that the pattern moves across the panel (up/down/left/right) may be controlled by this delay input.

Control knob CK3 is used to adjust the brightness of the LEDs 195 animated by microcontroller 105 by altering the brightness input 140 of microcontroller 105. Increasing the brightness input 140 using control knob CK2 increases a brightness of activated LEDs, and decreasing the brightness input 140 decreases the brightness of activated LEDs. As an example, a pattern or animation element may dynamically alter its size, brightness, or color based on a real-time sound input, while the range of brightness through which the LEDs can be driven can be changed by the brightness adjustment knob.

According to some embodiments, one or more input devices are used to select a color to be produced by the activated LEDs. For example, a wireless link or input device may be used to send control signals for changing the colors of the LEDs 195.

Toggle buttons BTN2 and BTN3 are used to send control signals to animate backward input 145 and animate forward input 150 for changing the mode or type of animation produced by LEDs 195. When BTN2 is pressed, a control signal is received by the microcontroller 105 at the animate back input 145, and the real-time animation produced by microcontroller 105 using LEDs 195 is adjusted accordingly. The microcontroller 105 may cycle through different animation types when toggle button BTN2 or toggle button BTN3 is pressed, for example, to change the animation type from a spiral animation to a color-shift animation, or to change from a rain fall animation to a firework animation. For instance, one animation may include an animation element moving across the display panel 195 in a different directions and the backward/forward adjustment would adjust the direction of movement of the object. In other animations, the animation object may circle or roll, in which case the backward/forward adjustment would alter the animation motion from a clock-wise manner to counter-clockwise motion, etc.

According to some embodiments, each individual LED of the plurality of LEDs 195 is assigned a unique identifier or address, and the unique identifier is used to parse the control signals such that the color or brightness of individual LEDs may be controlled. In this way, the LEDs are considered to be individually addressable. According to some embodiments, the LEDs are arranged into arrays, e.g., 8×8 blocks, 16×16 blocks, or single LED-wide strings. According to some embodiments, the microcontroller 105 is an Arduino microcontroller, for example, an Arduino Mega microcontroller having 8 KB of memory. In still further embodiments, the plurality of LEDs 195 are Adafruit NeoPixel or DotStar LEDs, or LEDs identified by part numbers WS2812, WS2811, WS2813, APA102 or APA102C.

Figure 2A:
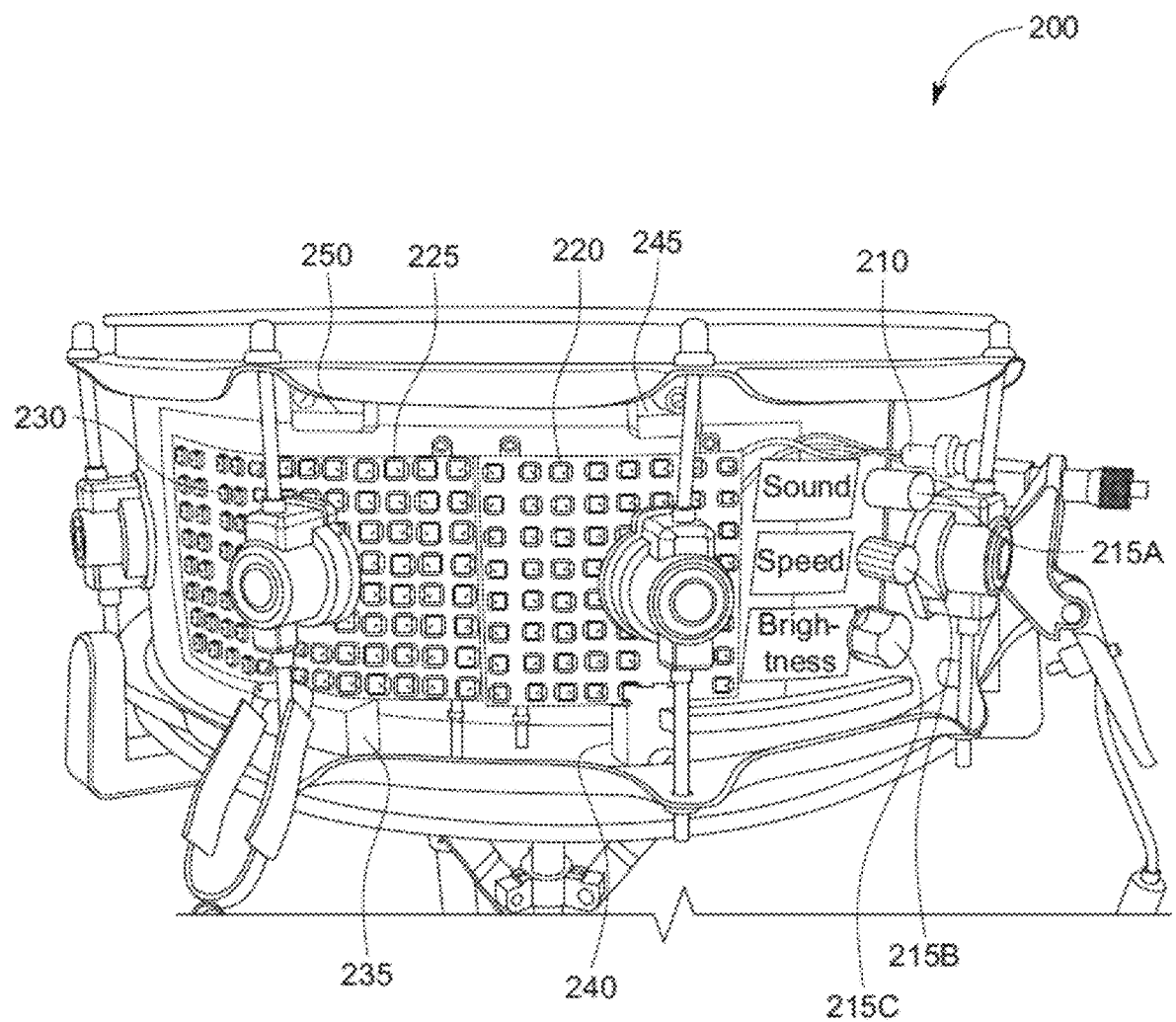
FIG. 2A is a diagram of a side view of an exemplary musical instrument (drum) with integrated LED dynamic lighting and animations for producing sound-driven lighting animations depicted according to embodiments of the present invention.

With regard to FIG. 2A, an exemplary musical instrument 200 with integrated LED lighting is depicted from a side view according to embodiments of the present invention. The musical instrument 200 is a snare drum and includes a plurality of LEDs for producing animated light using a microcontroller 210. The side walls of the drum 200 are fabricated of clear plastic or resin so that light may pass through. The LEDs are arranged in a two dimensional array and are visible from the outside of the drum and are secured to an interior surface of the musical instrument 200 (e.g., a vertical interior surface) using stand-offs 235, 240, 245, and 255. According to some embodiments, the standoffs include a thin slot for inserting and securing an LED strip or flexible block of LEDs so that the LED array can bend or flex in accordance with the curvature of the side walls of the drum. According to further embodiments, the standoffs include a second thin slot for inserting and securing a film or material that includes diffraction grafting or the like. Control knobs 215A, 215B, and 215C are used to adjust the sound level sensitivity and threshold, the animation speed, and the LED brightness of the LEDs (e.g., LED blocks 220, 225, and 230) respectively.

As depicted in FIG. 2A, the LEDs may be modular LED blocks or strips, such as 8×8 LED blocks 220, 225, and 230. Additional LED blocks may be disposed within the musical instrument 200 so that the interior surface the musical instrument is substantially covered by LED blocks. Each LED of the array is capable of displaying any color (including white) and therefore each LED contains red, blue and green light emitting sources. As mentioned above, the interior surface of the musical instrument may be a substantially transparent or translucent material, such as plastic or Plexiglas that allows the LED light to pass through the interior surface of the musical instrument such that the LED light is visible outside of the housing of musical instrument 200. According to some embodiments, semi-transparent or semi-translucent materials are disposed within the musical instrument 200 to refract or diffuse the LED lighting thereof. According to some embodiments, one or more reflective surfaces (e.g., mirrors) are disposed within the musical instrument 200 to reflect or direct the LED lighting thereof. According to some embodiments, a material comprising diffraction grating is disposed within the musical instrument 200 to split and diffract the LED light into several beams travelling in different directions.

Figure 2B:
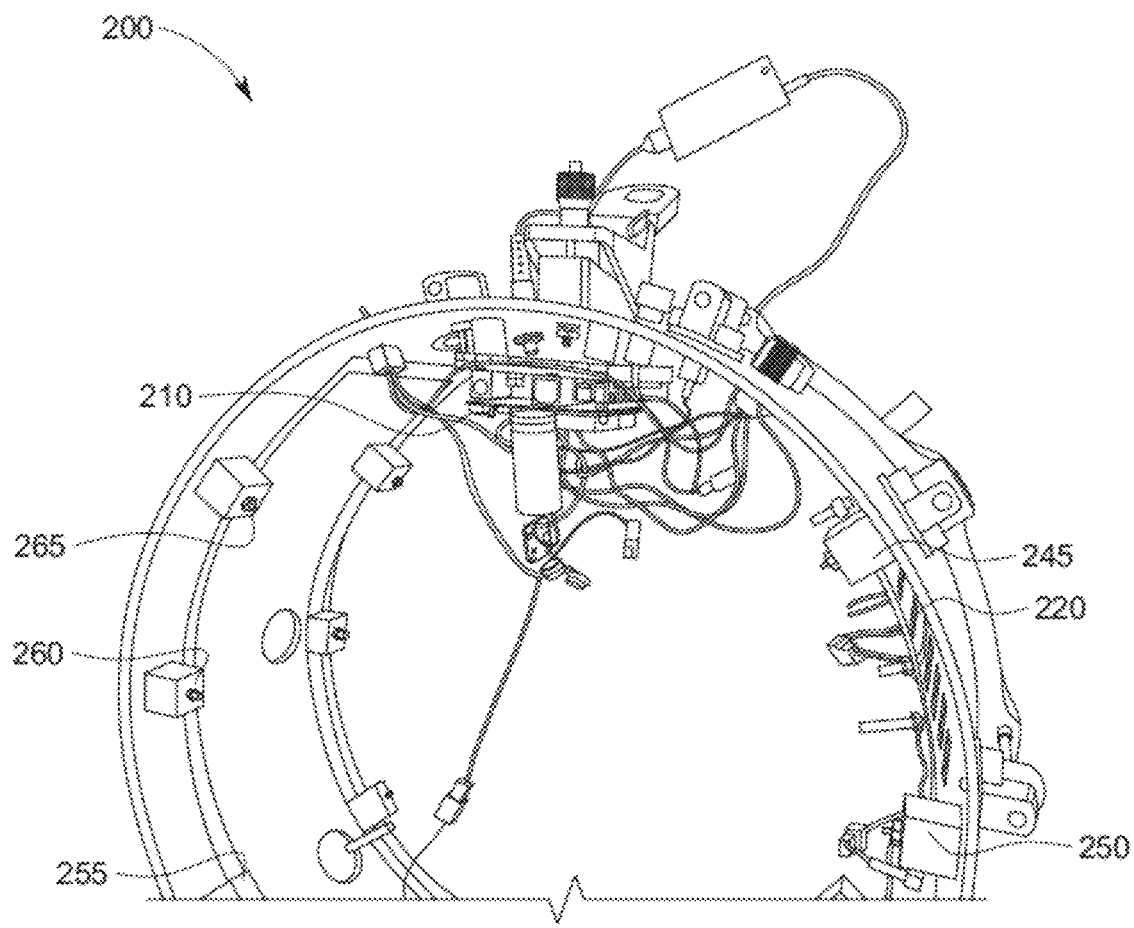
FIG. 2B is a diagram of a top view of an exemplary musical instrument (drum) with integrated LED dynamic lighting and animations for producing sound-driven animations depicted according to embodiments of the present invention.

With regard to FIG. 2B, the exemplary musical instrument 200 with integrated LED lighting is depicted from a top view according to embodiments of the present invention. The snare drum is used as an example again. As depicted in FIG. 2B, standoffs 245, 250, 255, 260, and 265 are used to secure LED blocks (e.g., LED block 220) to the interior of the musical instrument 200. A circuit 270 including a microcontroller 210 is used to generate control signals for animating the LED blocks. A top surface of the musical instrument (not pictured) covers the interior cavity of the instrument and is operable to produce sound via percussion. The sound produced by the instrument is measured by a microphone and used to drive the sound-driven animations produced by circuit 270. The circuit 270 activates a plurality of LEDs disposed within the interior cavity of the musical instrument, for example, on a vertical surface of the instrument, to render the sound-driven animations. As shown in FIG. 2B, the light emitting panels 220 are curved to match the curvature of the side walls of the drum. The LED panels are attached to the drum side walls via standoffs, 260 and 265, for instance.

Figure 3:
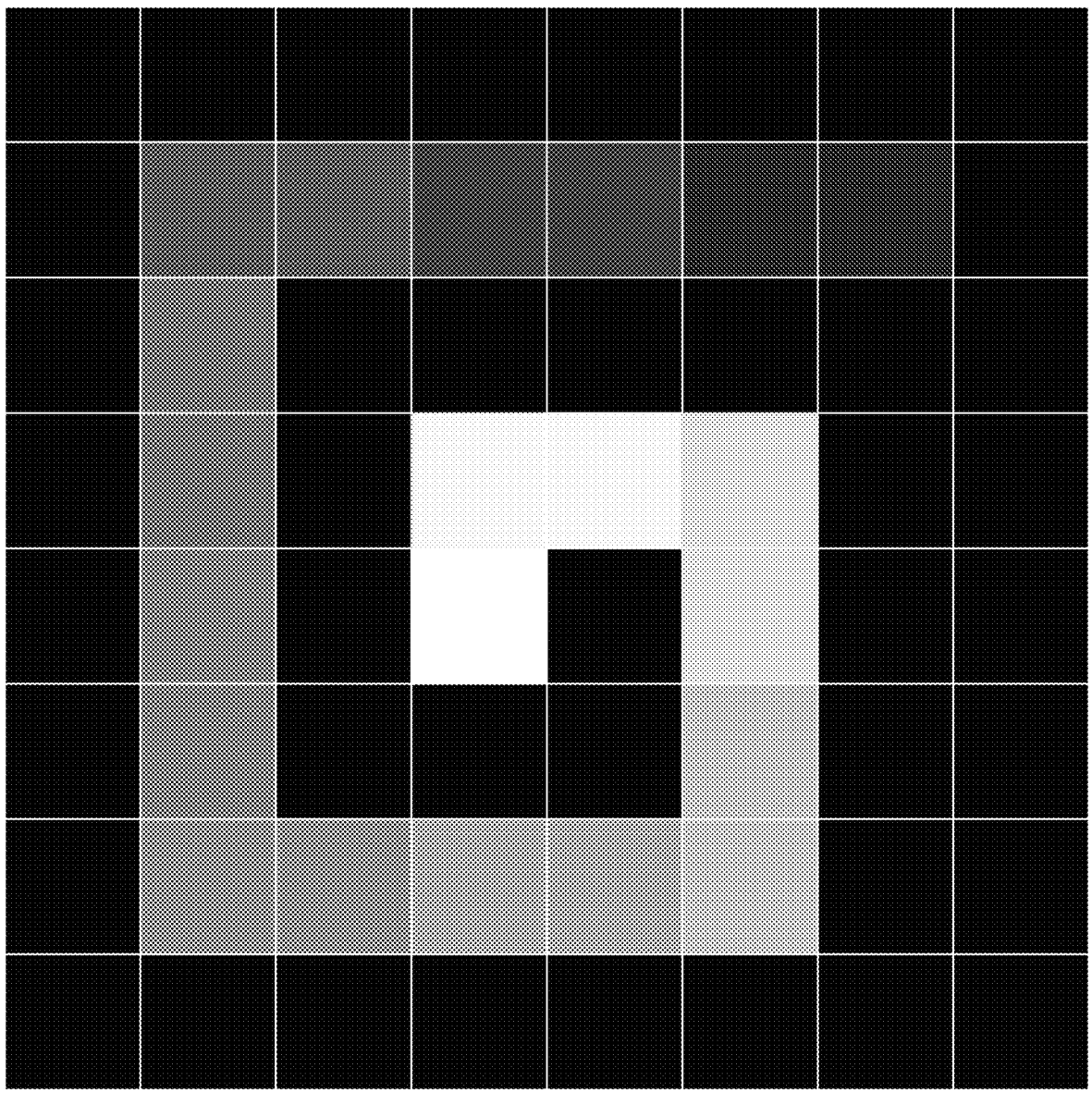
FIG. 3 depicts a snap shot in time of an exemplary spiral animation element produced responsive to real-time sound input of a musical instrument according to embodiments of the present invention.

Exemplary Sound-Driven Lightings and Lighting Animations for Dynamic Musical Instrument Lighting Embodiments of the present invention provide electronics and display elements for generating customizable dynamic lightings and lighting animations responsive to a musical instrument by activating LEDs and adjusting brightness and color values thereof responsive to sound input measured in real-time. "Lightings" herein refer to LED activations that are sound driven and cover any lighting response to the varying sound levels. "Lighting animations" refer to animation of an object and/or pattern with respect to the LED panel. Animations can refer to changes in the object size, object color, object brightness, object composition, object position, and/or object rotation, and may include one or all of the above. FIG. 3 depicts an exemplary spiral animation 300 or object produced responsive to real-time sound input according to embodiments of the present invention. The spiral animation is produced using a plurality of LEDs (e.g., one or more blocks of 8×8 LEDs) communicatively coupled to an LED interface that receives animation and control signals from a microcontroller. The animation object 300 may move across the LED panel, may increase/decrease in size, may spin, may displace across the LED panel and may change color, responsive to the real-time detected sound levels.

The number of LEDs that are activated (e.g., illuminated) by the LED interface may be proportional to the sound level detected by a microphone. Alternatively, or in combination with the activating LEDs based on the detected sound level, the speed and/or direction of the spiral animation can also be changed based on the detected sound level. For example, the spiral animation 300 may spiral inward or speed up when the detected sound level is above a threshold, and spiral outward or slow down when the sound level is below a threshold. As another example, the spiral animation 300 may spiral inward as the level of sound input is increasing, and spiral outward as the level of sound input is decreasing. The sound threshold and sensitivity can be adjusted by turning a control knob or dial associated with the threshold input value, for example.

The LEDs may also be configured to produce a single, solid color, where the color changes in steps responsive to sound input that exceeds a threshold level. For example, the LEDs may initially produce a solid red color, and when a detected sound level exceeds 76 dB, the LEDs shift one step closer to a blue color. Each time the detected sound level exceeds 76 dB, the LEDs shift another step towards blue until a solid blue color is produced. Thereafter, the LEDs may shift back towards a solid red color in steps whenever the detected sound level exceeds 76 dB, or change to another color, for example. In some embodiments, the number of color steps may be proportional to the amount by which the sound level exceeds the threshold.

Figure 4:
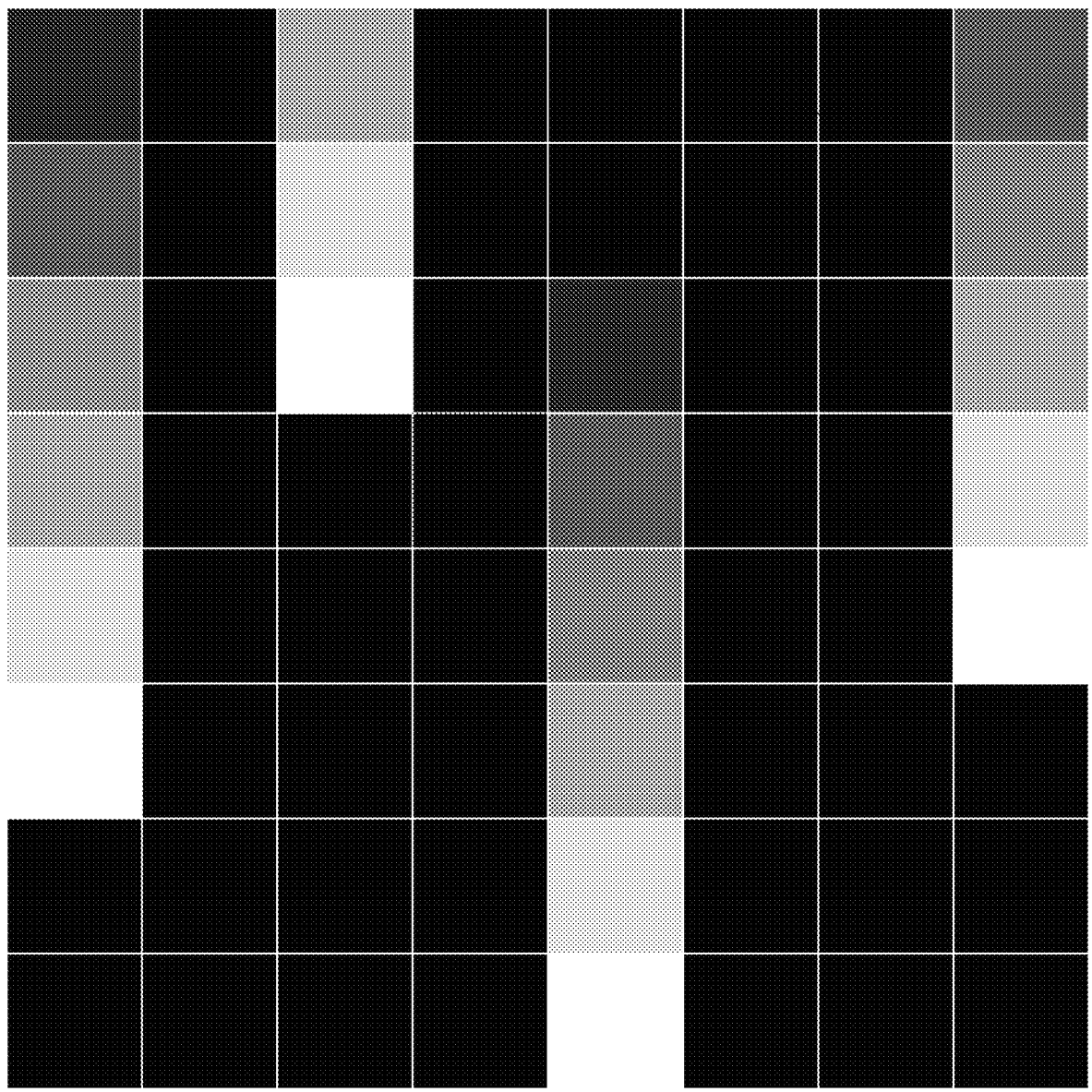
FIG. 4 depicts a snap shot in time of an exemplary rain fall animation produced responsive to real-time sound input of a musical instrument according to embodiments of the present invention.
Figure 5:
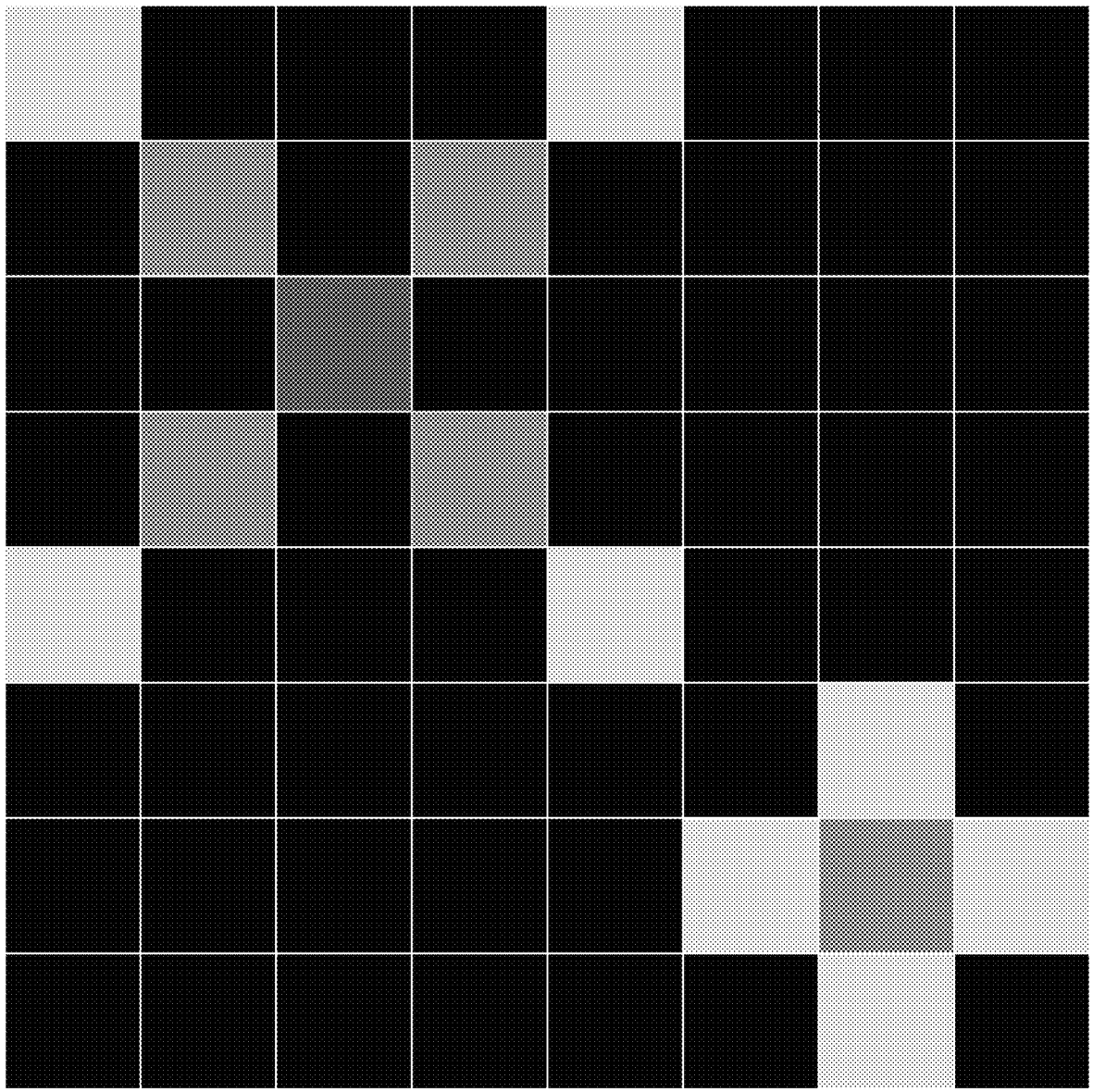
FIG. 5 depicts a snap shot in time of an exemplary firework animation produced responsive to real-time sound input of a musical instrument according to embodiments of the present invention.

With regard to FIG. 4, another exemplary sound-driven animation 400 is depicted according to embodiments of the present invention. The sound-drive animation 400 activates LEDs to form a pattern that resembles falling rain, where the brightness or number of the activated LEDs (e.g., "raindrops") or color of raindrops or speed of falling raindrops may be proportional to the detected sound level. With regard to FIG. 5, an exemplary sound-driven animation 500 is depicted according to embodiments of the present invention. The sound-drive animation 500 produces a pattern that resembles fireworks that "explode" or burst or expand rapidly responsive to sound input that exceeds a threshold level. Furthermore, the number and/or brightness or colors of the firework animations may be adjusted responsive to the level of sound input. It is appreciated that the patterns as shown in FIGS. 3-5 can be stored as data patterns (e.g., bitmaps) in computer readable memory which can be accessed by the microcontroller 105 and animated in accordance with the above descriptions and according to a real-time detected sound level.

Figure 6:
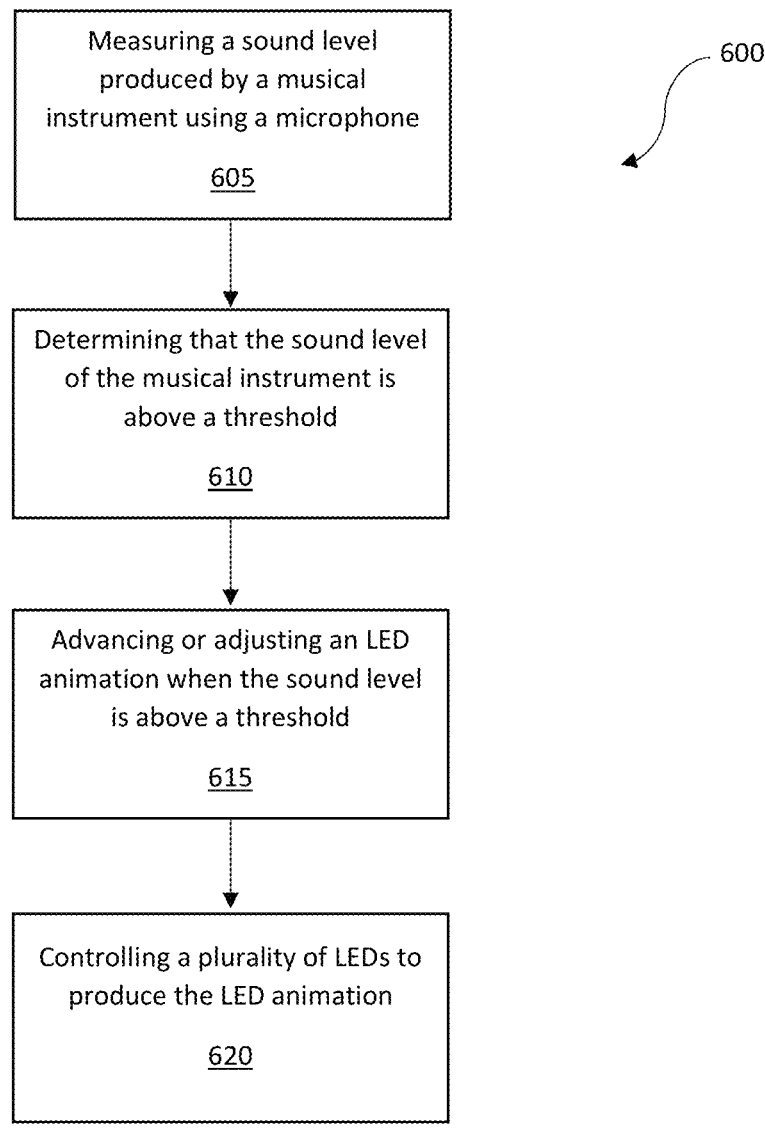
FIG. 6 depicts an exemplary sequence of computer implemented steps for producing dynamic LED animations for a musical instrument in real-time responsive to sound generated by the musical instrument according to embodiments of the present invention.

With regard to FIG. 6, an exemplary sequence of computer implemented steps 600 for producing LED animations for a musical instrument in real-time responsive to sound generated by the musical instrument is depicted according to embodiments of the present invention. Steps 600 may be stored as computer instructions in memory and accessed and performed by microcontroller 105, for instance. At step 605, a sound level produced by the musical instrument is measured and/or integrated. At step 610, it is determined that the measured sound level has exceeded a predetermined threshold (e.g., 76 dB). At step 615, responsive to the measured sound level exceeding the predetermined threshold, the LED animation is updated or adjusted using a microcontroller. For example, if the current animation mode of the microcontroller produces a color shifting animation, the color of the animation advances to the next color step in the color shift animation responsive to the sound level exceeding the predetermined threshold. The color shifting animation may include a mode that shifts colors by transposing rows and columns of the LED animation, for example. If the current animation mode of the microcontroller produces a spiral animation, the speed and/or direction of the spiral animation changes responsive to the sound level exceeding the predetermined threshold. The size, color, brightness, composition, speed of movement, direction of movement, orientation, and/or location, for instance, of an animation object or pattern may be varied at 615. At step 620, a plurality of LEDs are controlled to produce the LED animation, for example, by sending a control signal from the microcontroller to an LED interface communicatively coupled to the plurality of LEDs.

Figure 7:
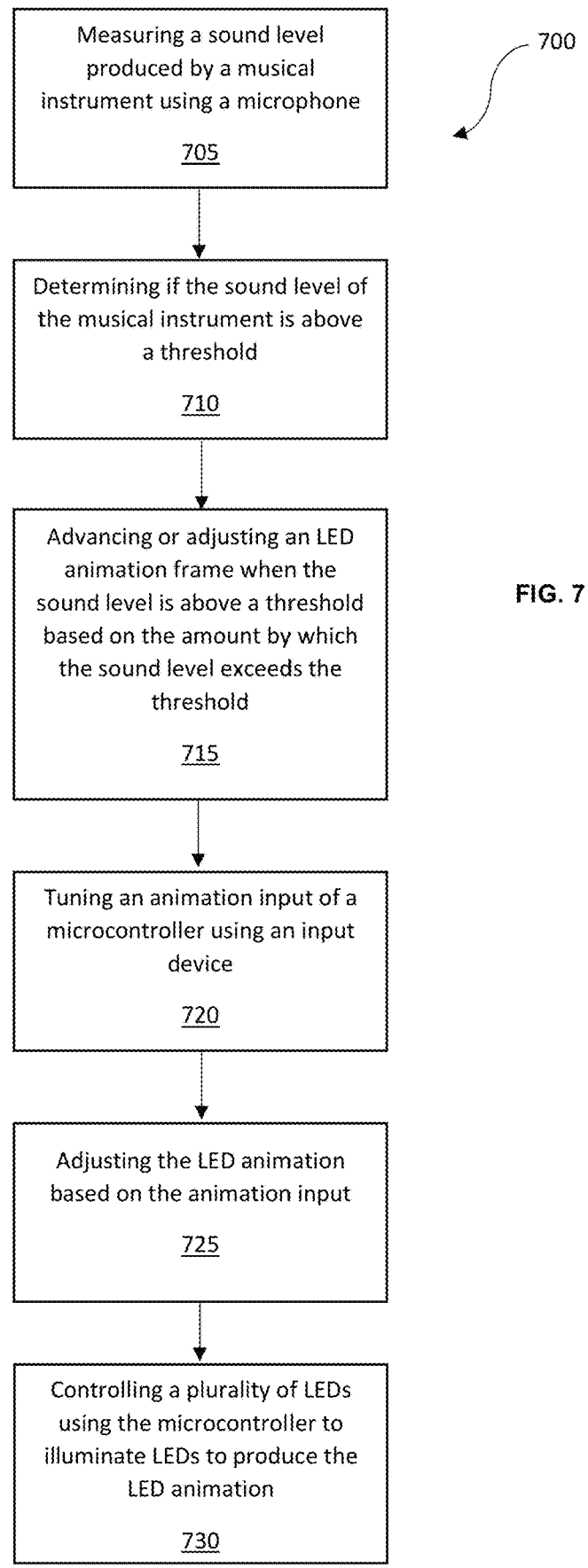
FIG. 7 depicts an exemplary sequence of computer implemented steps for producing dynamic LED animations for a musical instrument in real-time responsive to tuning from physical input devices and sound generated by the musical instrument according to embodiments of the present invention.

With regard to FIG. 7, an exemplary sequence of steps 700 for producing LED animations for a musical instrument in real-time responsive to tuning from physical input devices and sound generated by the musical instrument is depicted according to embodiments of the present invention. Steps 700 may be stored as computer instructions in memory and accessed and performed by microcontroller 105, for instance. At step 705, a sound level produced by the musical instrument is measured and/or integrated. At step 710, it is determined that the measured sound level has exceeded a predetermined threshold (e.g., 76 dB). At step 715, responsive to the difference between a measured sound level exceeding the predetermined threshold, an LED animation is updated or adjusted using a microcontroller based on said difference. At step 720, an animation input of the microcontroller is tuned using an input device (e.g., a control knob or button). At step 725, the LED animation is adjusted based on the tuning of step 720. At step 730, a plurality of LEDs are controlled to produce the LED animation, for example, by sending a control signal from the microcontroller to an LED interface communicatively coupled to the plurality of LEDs.

Figure 8:
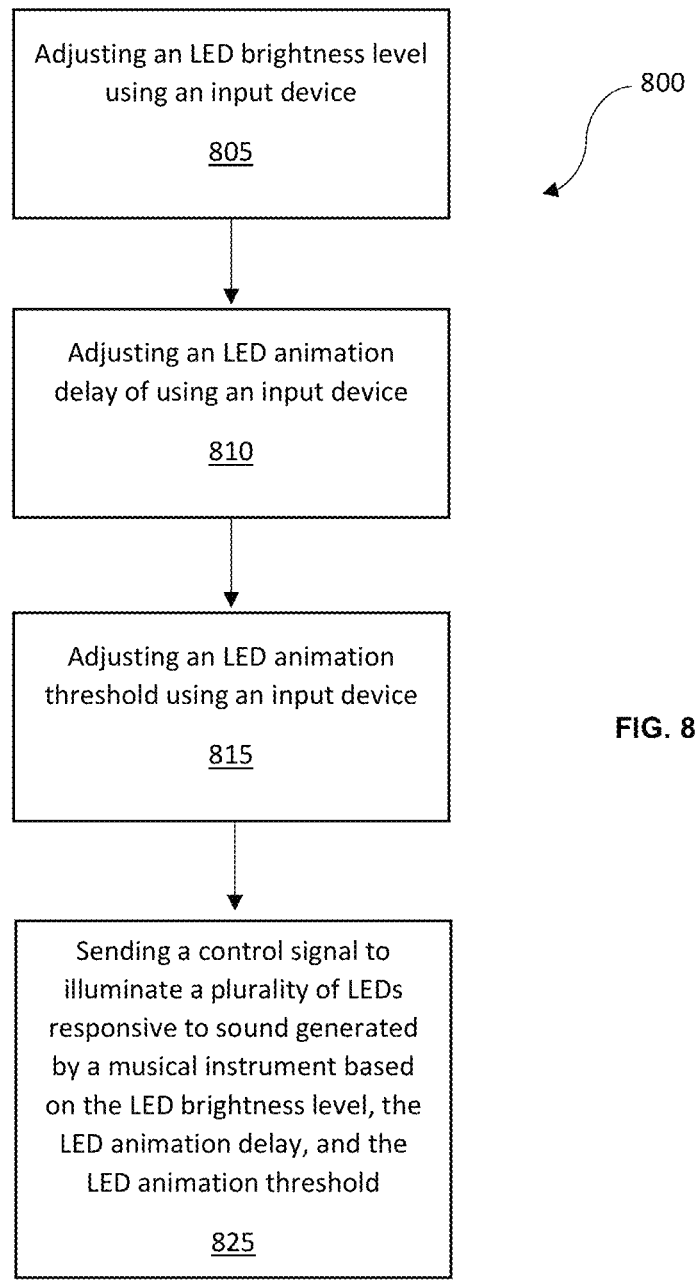
FIG. 8 depicts an exemplary sequence of computer implemented steps for controlling an LED interface using a microcontroller disposed within a musical instrument to produce LED animations responsive to sound generated by the musical instrument according to embodiments of the present invention.

With regard to FIG. 8, an exemplary sequence of computer implemented steps 800 for controlling an LED interface using a microcontroller disposed within a musical instrument to produce LED animations responsive to sound generated by the musical instrument is depicted according to embodiments of the present invention. Steps 800 may be stored as computer instructions in memory and accessed and performed by microcontroller 105, for instance. At step 805, an LED brightness level is adjusted using a physical input device coupled to the microcontroller, such as a rotary control knob. At step 810, an LED animation delay or animation speed is adjusted using a physical input device coupled to the microcontroller, such as a rotary control knob or wireless input. At step 815, an LED animation threshold is adjusted using a physical input device coupled to the microcontroller, such as a rotary control knob, where the animation threshold determines how the LED animation response to sound levels measured by a microphone. At step 820, a control signal is sent from the microcontroller to an LED interface to activate a plurality of LEDs coupled to the LED interface corresponding to the LED animation, where the LEDs are activated responsive to sound levels measured by the microphone, and where the LEDs are activated based on the brightness level, the animation delay, and the animation threshold defined by the physical input devices in steps 805, 810, and 815, respectively.

Embodiments of the present invention are thus described. While the present invention has been described in particular embodiments, it should be appreciated that the present invention should not be construed as limited by such embodiments, but rather construed according to the following claims.

What is claimed is:

1. An apparatus for producing dynamic lighting for use in conjunction with a musical instrument, said apparatus comprising:
    a microphone operable to detect real-time sound levels produced by the musical instrument;
    an LED interface and panel for controllably emitting light using a plurality of LEDs wherein each LED is discretely activated;
    a microcontroller operable to send control signals to the LED interface to cause the plurality of LEDs to emit light corresponding to lighting sequences; and
    an input device communicatively coupled to the microcontroller for adjusting an animation speed of the lighting sequences, wherein the microcontroller is further operable to determine that the sound level of the musical instrument is above a sound level threshold, and to generate updated control signals for the LED interface, wherein the updated control signals dynamically adjust the lighting sequence to change at least one of: a color; a brightness; and a number of LEDs of the plurality of LEDs illuminated responsive to determining that the sound levels produced by the musical instrument are above the sound level threshold,
    wherein the LED interface is operable to control the plurality of LEDs to produce the LED animation sequence in accordance with said sound level produced by said musical instrument and said animation speed of the LED animation sequence.

2. The apparatus as described in claim 1, wherein the plurality of LEDs are disposed within the musical instrument.

3. The apparatus as described in claim 2, wherein the plurality of LEDs are disposed on a surface of the musical instrument, and wherein the surface is substantially transparent.

4. The apparatus as described in claim 3, wherein the plurality of LEDs are secured to the surface of the musical instrument using a plurality of standoffs.

5. The apparatus as described in claim 1, further comprising a second input device communicatively coupled to the microcontroller for adjusting a brightness level of the plurality of LEDs.

6. The apparatus as described in claim 1, further comprising a second input device communicatively coupled to the microcontroller for adjusting the predetermined sound level threshold.

7. The apparatus as described in claim 1, wherein the lighting sequences are dynamically adjusted by varying one of a movement, a pattern, a size, and a speed of the lighting sequences.

8. A method of producing LED lighting for a musical instrument responsive to sound produced by said musical instrument, said method comprising:
    sending control signals to an LED interface to cause the LED interface to illuminate a plurality of LEDs, disposed in an array, using an LED animation sequence;
    measuring a sound level produced by the musical instrument in real-time using a microphone;
    determining that the sound level of the musical instrument is above a sound level threshold;
    receiving input from an input device to adjust an animation speed of the LED animation sequence; and
    generating updated control signals for the LED interface, wherein the updated control signals dynamically adjust the LED animation sequence to change at least one of: a color; a brightness; and a number of LEDs of the plurality of LEDs illuminated responsive to determining that the sound level is above the sound level threshold,
    wherein the LED interface controls the plurality of LEDs to produce the LED animation sequence in accordance with said sound level produced by said musical instrument and said animation speed of the LED animation sequence.

9. The method as described in claim 8, wherein the LED animation sequence comprises illuminating LEDs of the plurality of LEDs in a spiral pattern.

10. The method as described in claim 9, wherein the updated control signals adjust the LED animation sequence by increasing the animation speed of the LED animation sequence.

11. The method as described in claim 10, wherein the updated control signals adjust the LED animation sequence by changing an animation direction of the LED animation sequence.

12. The method as described in claim 8, further comprising receiving input from a second input device to adjust a brightness level of the plurality of LEDs.

13. The method as described in claim 8, further comprising receiving input from a second input device to adjust the sound level threshold or sensitivity.

14. A method for providing an LED animation for a musical instrument, said method comprising:
    defining an LED brightness level adjustment responsive to a setting of a first input device;
    defining an LED animation speed adjustment responsive to a setting of a second input device;
    defining an LED animation sound level threshold adjustment responsive to a setting of a third input device;
    generating real-time control signals for illuminating a plurality of LEDs communicatively coupled to an LED interface to display an LED animation that is adjustable and dynamic wherein said LED animation is adjustable in accordance with settings from said first, second and third input device and wherein said LED animation is dynamic by dynamically altering at least one of: a color; a brightness; and a number of LEDs of the plurality of LEDs illuminated in accordance with a sound level of detected real-time sound signals being above said animation sound level threshold adjustment;

sending said real-time control signals to said LED interface; and the plurality of LEDs displaying the adjustable, dynamic LED animation responsive to said real-time sound signals generated by the musical instrument and in accordance with said LED animation speed adjustment and said animation sound level threshold adjustment.

15. The method as described in claim 14, wherein the plurality of LEDs are disposed on a surface of the musical instrument, wherein the plurality of LEDs are secured to the surface of the musical instrument using a plurality of stand-offs, and wherein the surface is substantially transparent.

16. The method as described in claim 14, further comprising a fourth input device for changing an animation mode of the LED animation.

17. The method as described in claim 16, wherein the animation mode comprises at least one of: a spiral animation mode; a color shift animation mode; a firework animation mode; a rain mode; a twinkling star mode; and a shifting color row and transpose mode.

18. The method as described in claim 14, wherein the plurality of LEDs are disposed within a housing of the musical instrument, and wherein the housing is substantially transparent.

19. The method as described in claim 14, wherein said sending said real-time control signals to said LED interface comprises dynamically altering at least one of the LED brightness level and a number of active LEDs of the plurality of LEDs based on an amount by which the detected real-time sound signals exceed the LED sound level threshold adjustment.

* * * * *